Feb. 4, 1930.  A. M. ALEXANDRESCU  1,746,178
GEAR
Filed Dec. 17, 1927   2 Sheets-Sheet 1

Inventor
A. M. Alexandrescu
by Wilkinson & Giusta
Attorneys.

Feb. 4, 1930.  A. M. ALEXANDRESCU  1,746,178
GEAR
Filed Dec. 17, 1927   2 Sheets-Sheet 2
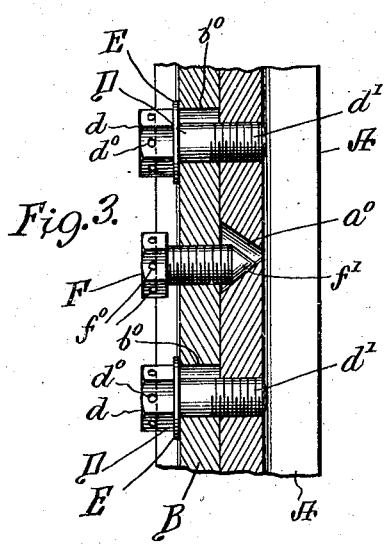
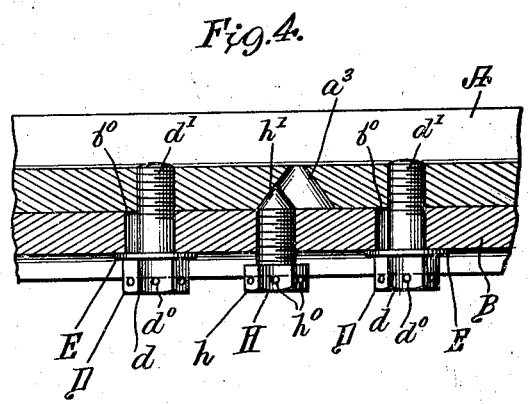
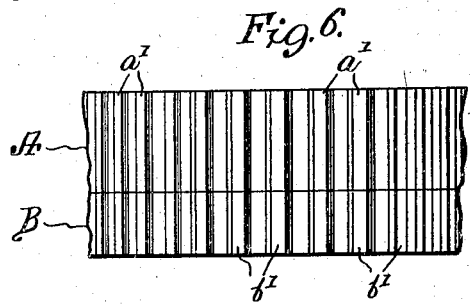
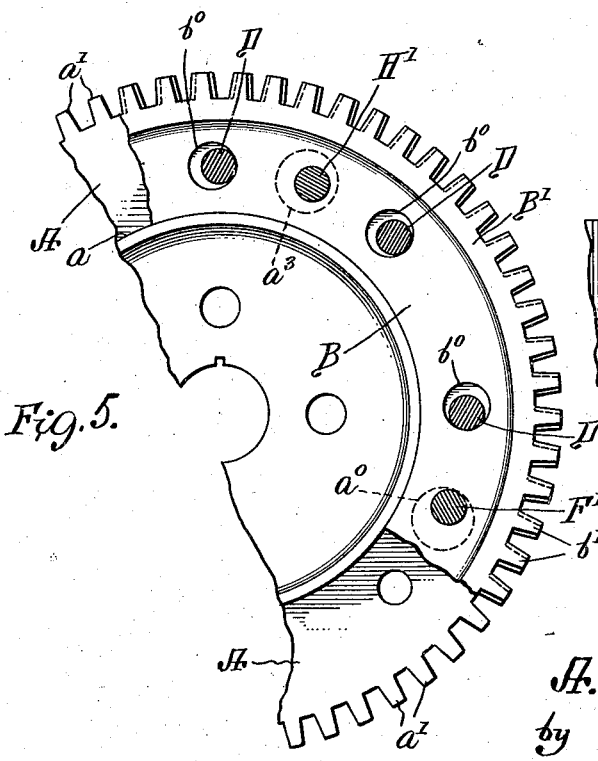
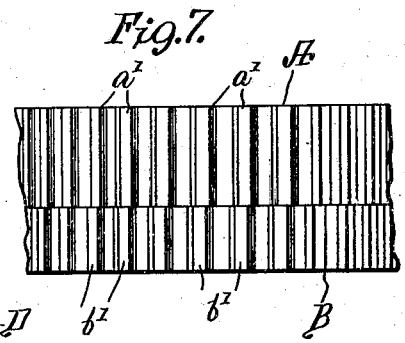
Inventor
A. M. Alexandrescu
by Wilkinson & Hursta
Attorneys.

Patented Feb. 4, 1930

1,746,178

UNITED STATES PATENT OFFICE

ALEXANDER M. ALEXANDRESCU, OF CLEVELAND, OHIO

GEAR

Application filed December 17, 1927. Serial No. 240,763.

My present invention relates to improvements in adjustable gears, and it is intended to provide a gear whose teeth may be readily adjusted to cooperate with another gear, to compensate for wear, and thus to avoid noise and also to prolong the life of the gear. My present invention is intended to provide a simplification over the apparatus illustrated and described in my application filed November 16, 1927, Serial #232,692 and entitled Improvements in gears.

My invention will be more fully understood after reference to the accompanying drawings in which like parts are indicated by similar reference symbols throughout the several views and in which Figure 1 is a side elevation, parts being broken away, to show my improved gear meshing with a driving pinion.

Figure 3 shows a section along the line 3—3 of Figure 1, and looking in the direction of the arrows, the parts being on a somewhat larger scale than in Figure 1.

Figure 4 shows a section along the broken line 4—4 of Figure 1, and looking in the direction of the arrows, the parts being shown into the same scale as Figure 3.

Figure 5 is a fragmentary plan view showing the manner of adjusting the gear teeth.

Figure 6 is a fragmentary view showing the two sets of gear teeth in alignment, and Figure 7 is a similar view to Figure 6, but it shows the same gear teeth after adjustment.

A represents the main body of the gear, whose periphery is flanged as at $A'$ and is provided with gear teeth $a'$. These teeth are shown as axially disposed so that the gear can be run backwards and forwards.

The body portion A of the gear is provided with a cylindrical shoulder $a$ to engage the cylindrical surface of the adjustable member B of the compound gear composed of the two parts A and B. This ring B is provided with a flanged periphery $B'$ having gear teeth $b'$ corresponding to the gear teeth $a'$ of the body portion A. C represents the driving gear having teeth $c'$ meshing with the teeth $a'$ and $b'$ as will be hereinafter described.

The ring B and the body portion A of the compound gear are connected together by the screw bolts D, having screw threads $d'$ to engage in screw threaded openings in the body portion A, and having heads $d$ perforated as at $d^0$ to permit the use therewith of locking wires, as will be hereinafter described.

These bolt heads $d$ are provided with suitable washers E. The bolts D pass freely through circular openings $b^0$ in the ring B so as to permit the circumferential adjustment of the said ring, as will be hereinafter described.

Figure 1:
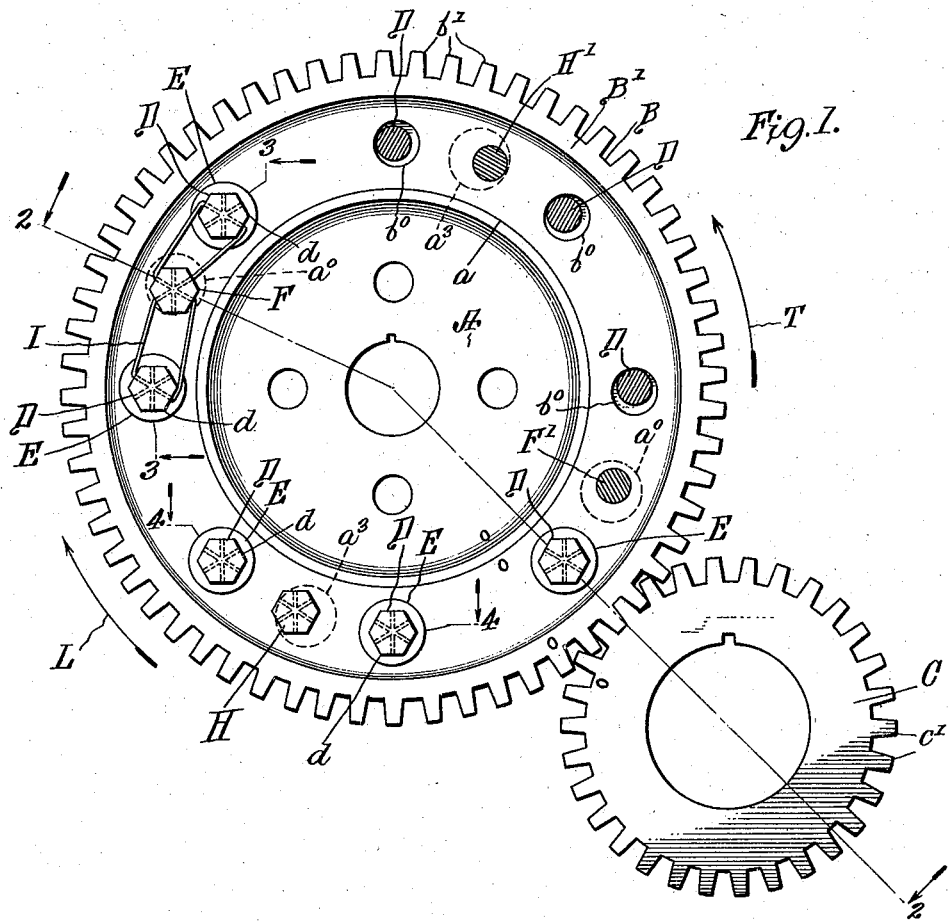
Figure 2:
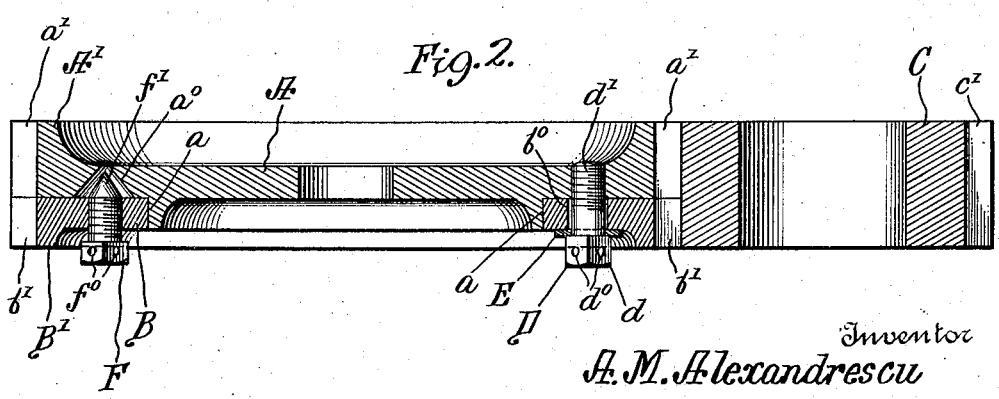
Figure 2 shows a section along the line 2—2 of Figure 1, and looking in the direction of the arrows.

Oppositely disposed, screws F and F' are provided as shown in Figures 1, 2 and 3, which are provided with tapered points $f'$ fitting in conical sockets $a^0$. The heads of these screws F are perforated as at $f^0$ to permit the use of locking wires therewith, as will be hereinafter described.

I also provide oppositely disposed adjusting screws H and H' generally similar, to the screws F and F' just described, one of which screws is shown in detail in Figure 4. These screws have conical points $h'$ fitting in conical sockets $a^3$ in the body portion A, and their heads $h$ are provided with perforations $h^0$ to permit the use of locking wires therewith. The screw bolts F and F' and bolts H and H' screw into threads provided in the ring B, and these bolts move with said ring, and have limited play circumferential relative to the body portion A; while the bolts D screw into body portion A, and the ring B has a limited play over these bolts, whereby the adjustment of the compound gear can be provided as will now be described.

In order to assemble the parts of the compound gear, the ring B is mounted upon the cylindrical shoulder $a$ of the body portion A and brought to the position shown in Figure 1. The screw bolts D, while resting against the edge of the holes $b^0$, as shown in Figure 1, are screwed down tight, and then the locking screws F and F' screwed into place. Thus the body portion A and ring B are tightly locked together against circumferential movement relative to one another, and are thus set to provide the desired position when the gear teeth can be cut upon the two members at the same time.

With the parts so assembled and the teeth $a'$ adjusted relative to the teeth $b'$, the screws F and F', and the screw bolts D are slightly loosened. Then the screws H and H' are screwed down into place, causing the ring B and teeth $b'$ to move in the direction indicated by the arrow T, shown in Figure 1. This operation takes up any back lash between the gears, but should the adjustment be too tight then loosen the screws H and H', and screw down on the screws F and F', thus moving the ring B and teeth $b'$ in the opposite direction indicated by the arrow L, shown in Figure 1, thus completing the adjustment.

When the proper adjustment is attained, first screw down tightly all the bolts D, then the screws F and F', and finally the screws H and H'. By the use of locking wires I shown to the left in Figure 1, a sufficient number or all of the bolts and screws can be locked. The parts remain in this position until the wear of the gears renders an adjustment necessary.

To secure such adjustment, remove the wires I and unscrew the screws F and F', and ease up on all the bolts D. Then screw down on the screws H and H' until the teeth are in adjusted alignment.

To secure such adjustment, ease up on all of the bolts D and on the bolts F and F', and screw down on the bolts H and H' until the teeth are in adjusted alignment. It will be seen that the adjustment in one direction is controlled by the screws F and F', and in the opposite direction by the screws H and H'; and when the proper adjustment has been finally secured, the screws are set up tight, and the parts are securely held against movement in either direction.

Figure 6 is intended to show the teeth in the initial alignment, as when the gear is first put in use, and Figure 7 is intended to show the teeth in adjusted alignment after there has been an objectionable wear on same.

After the teeth have been put in proper alignment to mesh with the gear C, the locking bolts F and F' are screwed down tight, and the fastening bolts D are also screwed down tight; then the compound gear is in shape to be used until another adjustment becomes necessary.

In such adjustments, a circumferential motion of from one or two one thousandth of an inch is ordinarily all that is required.

In the form of compound gear illustrated herewith having the body portion A of greater width in cross section than the ring B, as shown in Figure 2, it is intended that the gear be driven in only the one direction indicated by the arrow T, although it can also be driven in the opposite direction. I prefer to make the parts A and B of the same width in cross section for use where it is intended to drive the gear in either direction.

Where the compound gear is to be initially designed more especially to be driven in the direction indicated by arrow L shown in Figure 1, it is obvious that the parts A and B should have been placed in the position relative to one another as that shown in Figure 5, before the teeth were cut. In this case the screw bolts D, while engaging the diametrically opposite edge of the hole $b^o$ as shown in Figure 1, will have been screwed down tight as likewise the locking screws F and F'. In adjusting the gear made in this manner the ring B will be caused to move more particularly in the direction indicated by the arrow L, shown in Figure 1.

By having meshing made, one of softer material than the other, the gear teeth are in a large measure prevented from getting rough, and excessive noise is prevented, and the life of the gears is prolonged.

For this purpose, I prefer to make the driving gear of tempered steel, and the ring B and body portion A of softer material such as soft steel. By the herein described construction an extremely nice adjustment between co-acting gear teeth is effected, and lost motion between the gears is largely avoided, with the result that the excessive noise is in a great measure prevented, and the life of the gears is materially prolonged.

While I have illustrated and described one embodiment of the invention in its preferred form, it will be obvious that various changes might be made in the construction, combination, and arrangement of parts which could be used without departing from the spirit of my invention, and I do not mean to limit the invention to such details except as particularly pointed out in the claims.

Having thus described my invention, what I claim and desire to secure by Letters Patent of the United States is:

An adjustable gear comprising a wheel body having teeth thereon with a cylindrical shoulder located between the axis of the wheel body and said teeth, and conical sockets provided in the face of said wheel body exterior to said shoulder, of a ring provided with teeth similar to those on the wheel body, said ring being adapted to slip over said shoulder, said ring being provided with internal screw threads registering with said tapered sockets, and with elongated apertures and screw bolts passing into said ring and provided with tapered points engaging in said sockets, and other screw bolts passing freely through said elongated apertures and engaging in said wheel body, whereby the said ring may be adjusted and clamped tightly on said wheel body substantially as and for the purposes described.

ALEXANDER M. ALEXANDRESCU.